United States Patent
Lin et al.

(10) Patent No.: US 9,179,215 B2
(45) Date of Patent: Nov. 3, 2015

(54) ELECTRONIC DEVICE, ACCESSORY, AND METHOD FOR DETECTING AN ACCESSORY

(71) Applicant: HTC Corporation, Taoyuan (TW)

(72) Inventors: Wei-Syuan Lin, Taoyuan County (TW); Yuan-Yao Tu, Taoyuan County (TW); Che-Yuan Hsu, Taoyuan County (TW); Yu-Chun Peng, Taoyuan County (TW)

(73) Assignee: HTC CORPORATION, Taoyuan (TW)

( * ) Notice: Subject to any disclaimer, the term of this patent is extended or adjusted under 35 U.S.C. 154(b) by 259 days.

(21) Appl. No.: 13/762,771

(22) Filed: Feb. 8, 2013

(65) Prior Publication Data

US 2013/0223641 A1   Aug. 29, 2013

Related U.S. Application Data

(60) Provisional application No. 61/602,625, filed on Feb. 24, 2012.

(51) Int. Cl.
| | |
|---|---|
| *H04R 3/00* | (2006.01) |
| *H04M 1/725* | (2006.01) |
| *H04R 5/04* | (2006.01) |
| *H04M 1/60* | (2006.01) |
| *H04R 1/10* | (2006.01) |

(52) U.S. Cl.
CPC ............. *H04R 3/00* (2013.01); *H04M 1/72527* (2013.01); *H04R 5/04* (2013.01); *H04M 1/6058* (2013.01); *H04R 1/1041* (2013.01)

(58) Field of Classification Search
CPC .......... H04R 3/00; H04R 5/04; H04R 1/1041; H04M 1/72527; H04M 1/6058
USPC ............ 324/691; 381/74, 77, 105; 455/569.1; 726/34; 327/50; 368/10; 370/419; 713/323
See application file for complete search history.

(56) References Cited

U.S. PATENT DOCUMENTS

| | | | | |
|---|---|---|---|---|
| 6,457,134 | B1 * | 9/2002 | Lemke et al. | 713/323 |
| 7,024,230 | B2 * | 4/2006 | Curtiss et al. | 455/569.1 |
| 7,623,667 | B2 * | 11/2009 | Sander et al. | 381/74 |
| 7,823,214 | B2 * | 10/2010 | Rubinstein et al. | 726/34 |
| 7,948,246 | B2 * | 5/2011 | Agevik et al. | 324/691 |
| 8,064,613 | B1 * | 11/2011 | Helfrich | 381/74 |
| 8,193,834 | B2 * | 6/2012 | Maher et al. | 327/50 |

(Continued)

FOREIGN PATENT DOCUMENTS

| | | |
|---|---|---|
| EP | 2336895 A2 | 6/2011 |
| TW | 200723084 A | 6/2007 |
| TW | 201115161 A | 5/2011 |

*Primary Examiner* — Gerald Gauthier
(74) *Attorney, Agent, or Firm* — Rabin & Berdo, P.C.

(57) ABSTRACT

Electronic device, accessory, and method for detecting an accessory are provided. The electronic device includes a connector, a control unit, and an audio processing unit. The connector is configured to connect to an accessory and has an audio contact. The control unit has first and second terminals, which are coupled to the audio contact. The control unit is configured to send a command, which is represented by a first serial digital signal, to the accessory through the first terminal and audio contact when the accessory is electrically connected to the connector, and to receive accessory data, which is represented by a second serial digital signal and generated by the accessory in response to the command, through the second terminal and audio contact. The audio processing unit is coupled between the audio contact and control unit, and configured to receive an audio signal from the accessory through the audio contact.

22 Claims, 7 Drawing Sheets

(56) References Cited

U.S. PATENT DOCUMENTS

| | | | |
|---|---|---|---|
| 8,798,285 B2* | 8/2014 | Hung et al. | 381/74 |
| 2006/0045112 A1* | 3/2006 | Laiho | 370/419 |
| 2006/0215495 A1* | 9/2006 | Soled et al. | 368/10 |
| 2008/0318629 A1 | 12/2008 | Inha et al. | |
| 2009/0182908 A1 | 7/2009 | Sherman et al. | |
| 2010/0226509 A1* | 9/2010 | Filson et al. | 381/105 |
| 2012/0105051 A1* | 5/2012 | Furtner | 324/123 R |
| 2013/0223641 A1* | 8/2013 | Lin et al. | 381/77 |

\* cited by examiner

ELECTRONIC DEVICE, ACCESSORY, AND METHOD FOR DETECTING AN ACCESSORY

This application claims the benefit of U.S. provisional application Ser. No. 61/602,625, filed Feb. 24, 2012, the disclosure of which is incorporated by reference herein in its entirety.

BACKGROUND

1. Technical Field

The disclosure relates to an electronic device, an accessory, and a method for detecting an accessory.

2. Description of the Related Art

Accessories, e.g. headsets, microphones and speakers, with or without a remote control function are convenient for users to use electronic devices, such as multimedia players, personal digital assistants (PDA), smart phones, mobile phones and tablet computers, with versatile functionalities, such as listening to music, recording sounds, and receiving a phone call.

The conventional detecting mechanism used by electronic devices for identifying accessories, e.g. different headsets with a microphone and different headsets without a microphone, or for identifying different control functions of an accessory is according to a signal level detected through an audio jack (e.g., by way of analog approach). Different electronic device manufacturers may have their own specifications to define detected voltage levels for the accessories. In some situations, the conventional detecting mechanism used by an electronic device for identifying accessories made by "A" company may make misjudgment if the consumed current of an accessory made by "B" company is the same as that of an accessory made by the "A" company. In addition, conventional detecting mechanism has no extensibility since the tolerance of the consuming current (e.g., for MIC) is too large. The conventional detecting method could only detect four different accessories and support three remote control buttons, e.g., Back button, Play/Stop button and Forward button. Further, since the detection is by way of voltage detection, the electronic device needs at least 0.5 seconds to detect the connection of the accessory.

SUMMARY

The disclosure is directed to an electronic device and a method for detecting an accessory.

According to one embodiment, an electronic device is provided. The electronic device includes a connector, a control unit, and an audio processing unit. The connector is configured to connect to an accessory and has an audio contact. The control unit has a first terminal and a second terminal, which are coupled to the audio contact of the connector. The control unit is configured to send a command, which is represented by a first serial digital signal, to the accessory through the first terminal and the audio contact when the accessory is electrically connected to the connector, and to receive accessory data, which is represented by a second serial digital signal and generated by the accessory in response to the command, through the second terminal and the audio contact. The audio processing unit is coupled between the audio contact and the control unit, and configured to receive an audio signal from the accessory through the audio contact.

According to one embodiment, an accessory for an electronic device is provided. The accessory includes a connector for connecting to the electronic device, a microphone, a microphone line configured to connect the microphone to the connector, a control interface unit, and a controller. The controller has a plurality of terminals including a power terminal, a data terminal, and a plurality of control terminals, wherein the power terminal is coupled to the microphone line, the data terminal is coupled to the microphone line, and the control terminals are coupled to the control interface unit. When the connector is connected to the electronic device, the power terminal receives a power signal for powering the controller, and in response to a command, which is represented by a first serial digital signal and received through the microphone line and the data terminal from the electronic device, the controller sends an identification of the accessory, which is represented by a second serial digital signal, through the data terminal and the microphone line to the electronic device.

According to one embodiment, a method, implemented in an electronic device having a connector, for detecting an accessory is provided. The method includes the step of (a) when the accessory is electrically connected to the electronic device, providing the power signal at an audio contact of the connector; (b) sending a command, which is represented by a first serial digital signal, to the accessory through the audio contact; (c) determining whether an identification of the accessory, which is represented by a second digital signal, is received at the audio contact; (d) if the identification of the accessory is received, determining the accessory is of a first type; otherwise, determining the accessory is of a second type.

In the following detailed description, for purposes of explanation, numerous specific details are set forth in order to provide a thorough understanding of the disclosed embodiments. It will be apparent, however, that one or more embodiments may be practiced without these specific details.

In other instances, well-known structures and devices are schematically shown in order to simplify the drawing.

DETAILED DESCRIPTION

Figure 1:
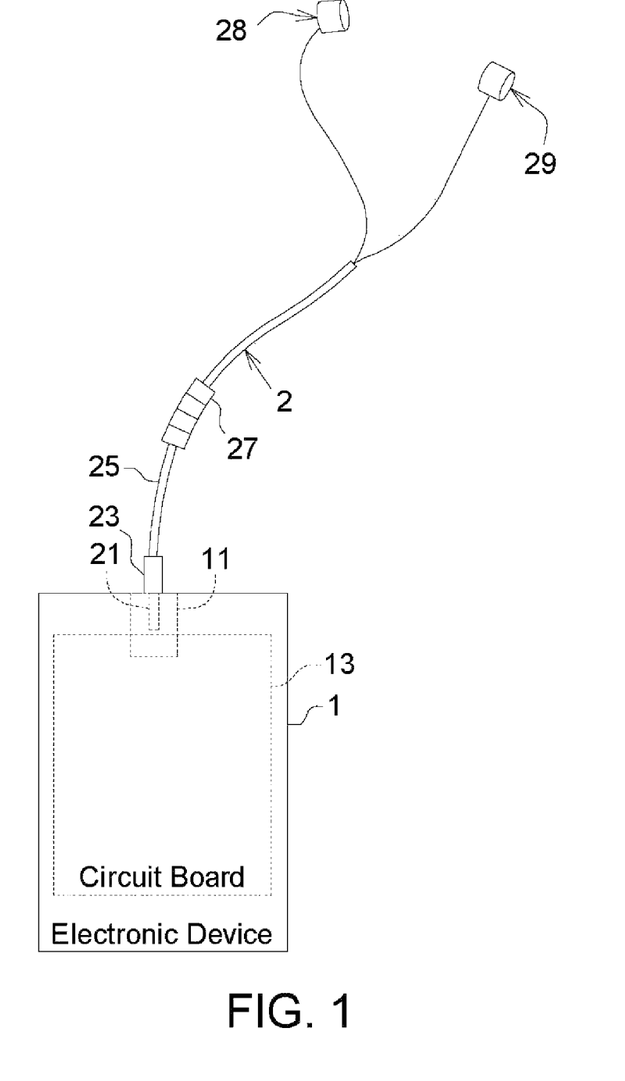
FIG. 1 illustrates an electronic device connected to an accessory according to an embodiment of the present disclosure.

FIG. 1 illustrates an electronic device connected to an accessory according to an embodiment of the present disclosure. In FIG. 1, an electronic device 1 can be embodied as any mobile or portable computing devices, e.g., a mobile phone, a personal digital assistants (PDA), a smart phone, a tablet computer, a multimedia player, a game machine, a notebook computer and so on. The accessory may be implemented as various kinds of accessories, such as a headset with microphone or without microphone, or a headset with or without control buttons. An example of the accessory shown in FIG. 1 is a headset 2, which includes an audio plug 23, a headset cable 25, a control interface 27, and speakers 28 and 29, and may include a microphone, for example, equipped in the control interface 27. As shown in FIG. 1, the electronic device 1 has a circuit board 13 and an audio jack 11 connected to the circuit board 13. The audio jack 11 has a hole 21 with contacts for connecting the audio plug 23 of the headset 2. In some examples, the electronic device 1 may further include a plurality of components disposed on or electrically connected to the circuit board 13, such as a processing unit (such as a single core, multi-core processor, or system-on-chip), a display unit (such as an LCD, OLED, so on or a display device with touch sensing functionality), a storage unit, and a communication unit (e.g., a communication processor supporting one or more of communication standards for 2G, 3G, 3.5G, 4G, WiFi, and so on).

Figure 2:
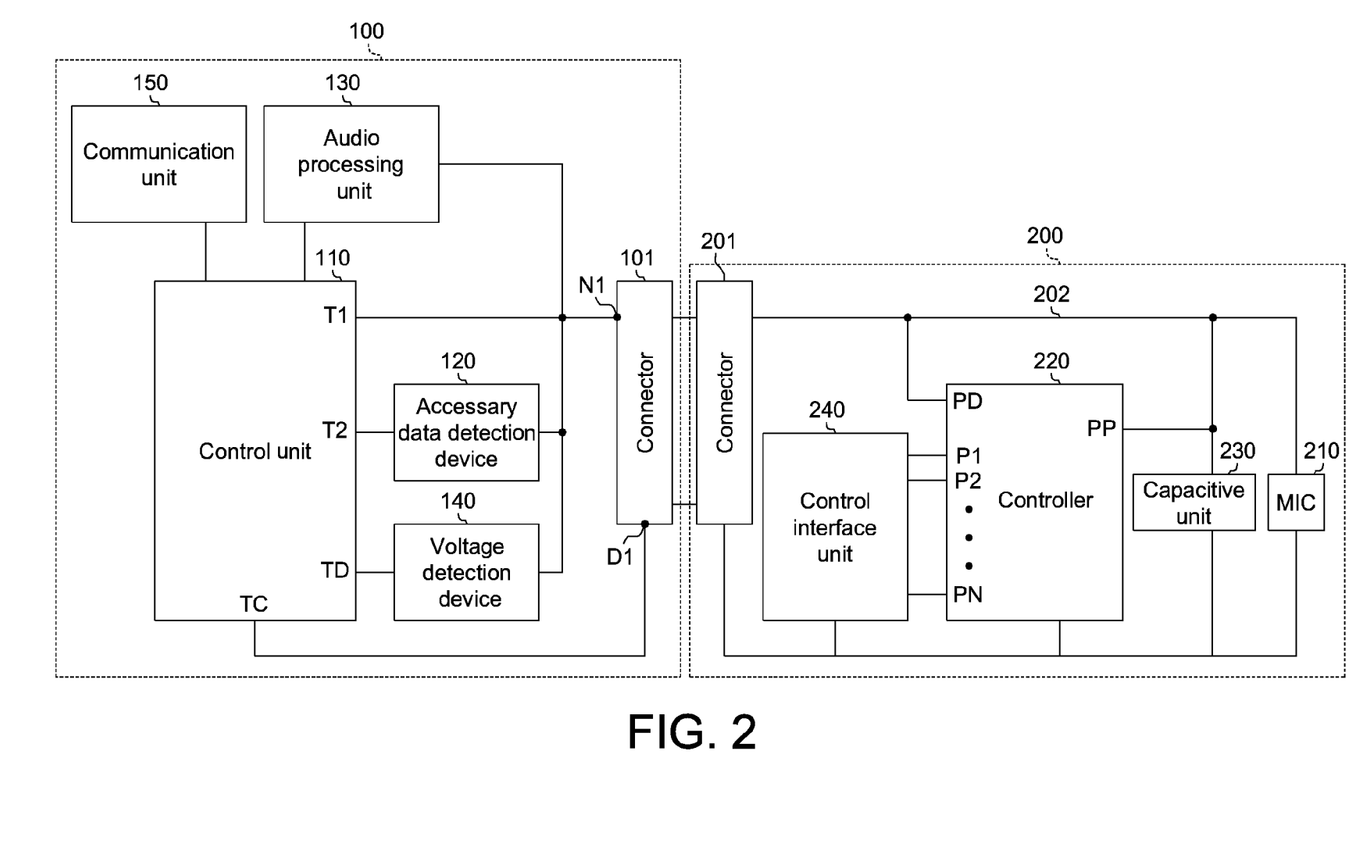
FIG. 2 shows a system block diagram of an electronic device connected to an accessory according to one embodiment of the present disclosure.

FIG. 2 shows a system block diagram of an electronic device connected to an accessory according to one embodiment of the present disclosure. An electronic device 100 includes a connector 101, a control unit 110, an accessory data detection device 120, and an audio processing unit 130. An accessory 200 includes a connector 201, a microphone (MIC) 210, a controller 220, a capacitive unit 230, a control interface unit 240, such as a unit including a plurality of control buttons and/or a navigation key, or other control panel, for a user to enter input(s) for controlling the electronic device 100. In this embodiment, the accessory 200 may be a headset and may further include at least one speaker and at least one speaker line (not shown) connecting the at least one speaker to the connector 201.

In FIG. 2, the connector 101 of the electronic device 100 is employed for connecting with the connector 201 of the accessory 200 so that the electronic device 100 and the accessory 200 are electrically connected to each other. The connector 101 of the electronic device 100 has a plurality of contacts including an audio contact N1 for receiving an audio signal from the microphone 210 of the accessory 200 and a detection contact D1 for detecting a complete electrical connection of the connector 101 with the connector 201. The accessory 200 has a signal line 202, e.g., a microphone line, corresponding to the audio contact N1. When the accessory 200 is electrically connected to the electronic device 100, the signal line 202 is electrically coupled to the audio contact N1. In this embodiment, the connector 101 may be a 2.5 mm or 3.5 mm audio jack and the connector 201 may be a 2.5 mm or 3.5 mm audio plug.

Figure 4:
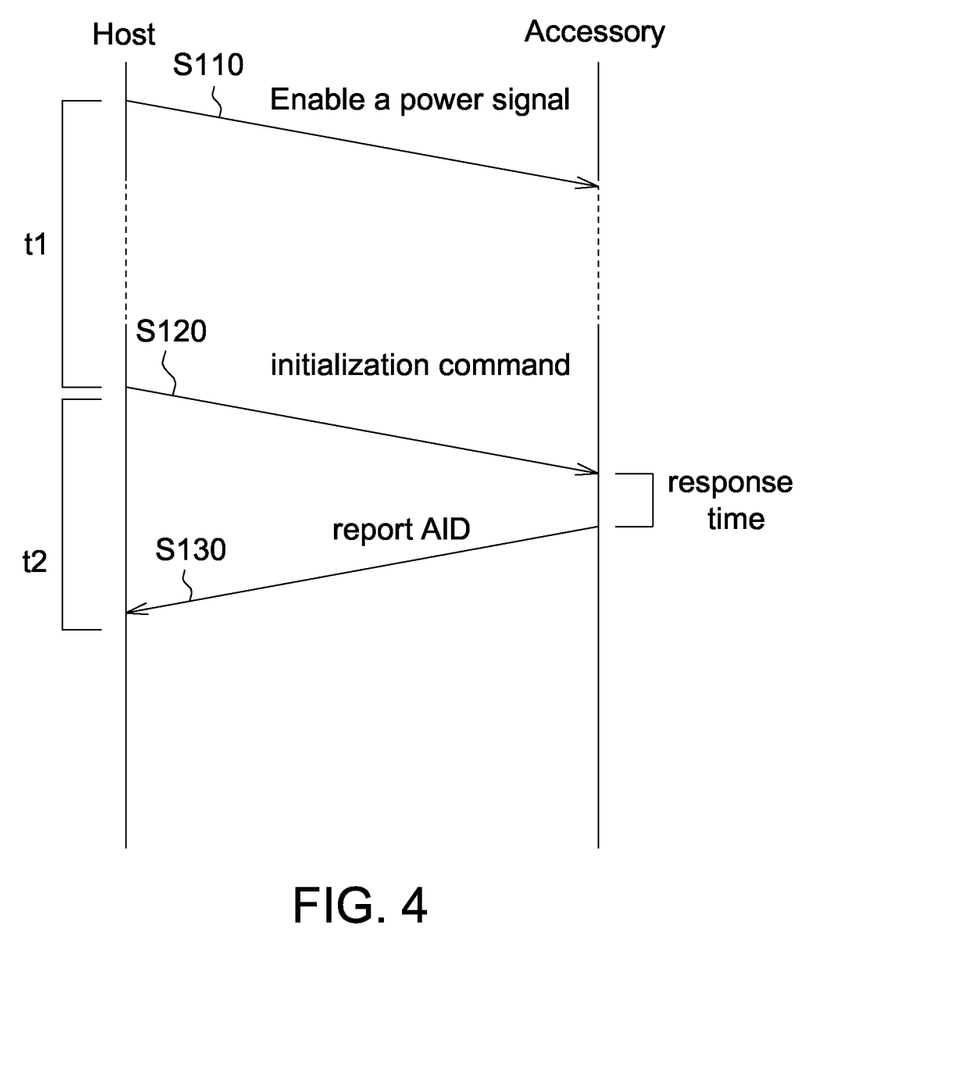
FIG. 4 shows a communication protocol between a host and an accessory shown in FIGS. 2 and 3.

In one embodiment, a communication protocol can be implemented for communication between the electronic device 100 and the accessory 200. In its initial form, the communication protocol includes steps as follows. Referring to FIG. 4, when the electronic device 100 (i.e. Host) is electrically connected to the accessory 200 (i.e. Accessory), which is compliant with the communication protocol, the host enables a power signal, as indicated in step S110, and provides it to the accessory 200, for example, through the audio contact N1 of the connector 101. The accessory 200 is then powered by the power signal. In step S120, the electronic device 100 sends an initialization command to the accessory 200, for example, through the audio contact N1. In response to the initialization command, the accessory 200 sends an accessory identification (AID) of the accessory 200 to the electronic device 100, as indicated by step S130. In this embodiment, the AID is stored in a storage unit inside or electrically coupled with the controller 220. After receiving the AID from the accessory 200, the electronic device 100 can identify the type of the accessory 200 by the AID and operate in an operation mode corresponding to the type of the accessory 200. For example, the electronic device 100 enters an operation mode (hereinafter, also referred to as "one-wire" mode, which will be further exemplified later) in which the electronic device 100 operates in response to a control signal, which is represented by a serial digital signal and received from the accessory 200. Hence, in response to a user operation with the control interface unit 240, the accessory 200 can send the control signal for controlling the electronic device 100. In addition, since the electronic device 100 and the accessory 200 can communicate with each other in digital form, the accessory 200 can be realized to achieve various and even extendable control functionality and the control interface unit 240 become more flexible and extendable in implementation for different requirements.

Referring back to FIG. 2, the electronic device 100 is configured to compliant with the communication protocol of FIG. 4. In the electronic device 100, the control unit 110, e.g., a processing unit (such as a single core, multi-core processor, or system-on-chip), has a plurality of terminals including a first terminal T1 and a second terminal T2, which are coupled to the audio contact N1 of the connector 101.

The power signal (such as a bias voltage) is provided at the audio contact N1, for example. In another example, the control unit 110 may be configured to enable the power signal to be provided at the audio contact N1 when the connection to the accessory 200 is detected.

In addition, the control unit 110, in response to a signal indicating that an accessory (such as the accessory 200) is connected to the connector 101, sends an initialization command to the accessory 200 through the first terminal T1 of the control unit 110 and the audio contact N1. The connector 101 may include a detection mechanism for triggering a signal indicating the connection of an accessory, for example, by using a switch. In an example, the control unit 110 further employs one of the terminals TC in FIG. 2, to connect with the detection contact D1 of the connector 101 and receive a detection signal indicating a complete electrical connection of an accessory with the electronic device 100. In other examples, an impedance-based (or current-based or voltage-based) detection circuit for detecting the electrical connection between the electronic device 100 and the accessory 200 can be implemented in the electronic device 100, for example, in the control unit 110 or the audio processing unit 130 or a dedicated detection unit coupled between the connector 101 and the control unit 110.

Further, in the electronic device 100, the accessory data detection device 120, coupled between the audio contact N1 and the second terminal T2 of the control unit 110, is configured to receive accessory data, e.g. AID, generated by the accessory 200, via the audio contact N1 and to output it to be received by the second terminal T2 of the control unit 110. In a case, as mentioned above in step S130, the accessory 200 sends accessory data indicating an accessory identification (AID) to the electronic device 100, and thus the accessory data is received by the electronic device 100 at the audio contact N1. Meanwhile, the microphone 210 of the accessory 200 can also generate audio signal and output it to the electronic device 100 through the signal line 202. The audio signal received by the electronic device 100 will also arrive at the audio contact N1. In one embodiment, the accessory data detection device 120 is configured to receive the accessory data and ignore (e.g., filter out or eliminate) the audio signal received at the audio contact N1.

Moreover, the audio processing unit 130, coupled between the audio contact N1 and the control unit 110, is used for receiving the audio signal, which is generated by microphone 210 and outputted from the accessory 200, at the audio contact N1 so as to perform further audio processing, such as analog-to-digital conversion. In some examples, the electronic device 100, which is implemented as a communication device, may include a communication unit 150 (such as a communication processor supporting mobile, wireless, or broadband communication), coupled to the control unit 110, for wirelessly transmitting an audio signal to a remote unit, e.g., base station or an access point, during a communication session (such as a mobile phone call, internet-protocol-based call, or a video conference call).

Referring to FIG. 2, the accessory 200 is also configured to compliant with the communication protocol of FIG. 4. When the connector 201 of the accessory 200 is electrically connected to the electronic device 100, a power terminal PP of the accessory 200 receives the power signal, which is provided at the audio contact N1, from the electronic device 100 for powering the controller 220. In response to the initialization command received from the electronic device 100 through a data terminal PD and the signal line 202 (such as a microphone line), the controller 220 sends an identification of the accessory (i.e., AID) through the data terminal PD and the signal line 202 to the electronic device 100. The controller 220 has a plurality of terminals including the power terminal PP, the data terminal PD, and a plurality of control terminals P1, P2, . . . , PN. The power terminal PP is coupled to the signal line 202 and the capacitive unit 230, the data terminal PD is coupled to the signal line 202, and the control terminals P1-PN are coupled to the control interface unit 240.

Referring to FIG. 2 and FIG. 4, the initialization command may include a response time. When the controller 220 receives the initialization command including the response time, the controller 220 delays, for the response time, sending the accessory identification (AID) to the electronic device 100. The AID is sent to the electronic device 100 through the data terminal PD. After sending the AID, the controller 220 operates in a first operation mode (i.e., one-wire mode), in which the controllers 220 may send a control signal, which is corresponding to an input signal generated by the control interface unit 240, to the electronic device 100. The control signal is represented by a serial digital signal. In addition, the initialization command may include an interrupt delay time (also referred to as interrupt delay), which is received by the controller 220 of the accessory 200. When the controller 220 of the accessory 200, operating in the first operation mode, receives the input signal generated by the control interface unit 240, the controller 220 sends an interrupt through the data terminal PD to interrupt the electronic device 100, and then delays, for the interrupt delay time, sending the control signal, corresponding to the input signal, to the electronic device 100. The control signal is sent to the electronic device 100 through the data terminal PD and the signal line 202. In the above-mentioned embodiments, the control signal is generated by the controller 220 according to the input signal, which is generated by the control interface unit 240 in response to a user input received by the control interface unit 240.

In other embodiments, the circuit block diagram of the electronic device 100 can further operate in other operation mode(s), besides the communication protocol, for communication between the electronic device 100 and different accessories, so as to support different types of accessories, which may not be compliant with the communication protocol.

For these embodiments, the electronic device 100, as shown in FIG. 2, may further include a voltage detection device 140, coupled between the audio contact N1 and the control unit 110, for detecting a voltage level at the audio contact N1 and outputting a digital signal indicating the detected voltage level to the control unit 110. In one embodiment, according to the outputted signal of the voltage detection device 140, the control unit 110 of the electronic device 100 could determine whether to send an initialization command to the accessory 200 and identify at least one accessory, which is not compliant with the communication protocol. When the control unit 110 receives an identification of an accessory (AID) compliant with the communication protocol through the second terminal T2, the electronic device 100 enters a first operation mode (i.e. one-wire mode), in which the control unit 110 operates in response to a control signal (such as a control signal corresponding to a user input received by the control interface unit 240 of the accessory 200) received through the second terminal T2 of the control unit 110. When an accessory connected to the electronic device 100 is not compliant with the communication protocol, such as a headset without the controller 220 and using different voltage levels at a specific contact as control indication, the control unit 110 does not receive an identification of the accessory (AID), and the electronic device 100 enters a second operation mode (hereinafter, also referred to as "legacy mode"), in which the control unit 110 operates in response to the voltage level detected by the voltage detection device 140 as indicating a remote control operation from the accessory. In other embodiment, the term "legacy mode" may indicate any mode, which is different from the "one-wire mode" for detecting different accessories and different control signals from accessories.

In one embodiment, after the power signal is provided at the audio contact N1, the control unit 110 sends the initialization command through the first terminal T1 when the voltage detection device 140 detects that a voltage level at the audio contact satisfies a condition with respect to a threshold; e.g., the voltage level is greater (or smaller) than a first threshold. Referring to FIG. 2, the connection of the electronic device 100 and the accessory 200 generates a specific voltage level (e.g., 0.25V or 0.9V after the power signal is provided for a period of time, e.g., 80 ms or 150 ms) at the audio contact. The connection of the electronic device 100 and an accessory not compliant with the communication protocol may generate a voltage level not greater (or not smaller) than the specific voltage level because no corresponding circuit components in the accessories to maintain its corresponding voltage. In this way, the control unit 110 can determine that the accessory is not compliant with the communication protocol and thus does not need to send the initialization command to the accessory. On the contrary, if it is determined that the accessory is compliant with the communication protocol, the control unit 110 needs to send the initialization command to the accessory and wait for the AID, as illustrated in one of the above embodiments. In another of these embodiments, in response to a signal indicating that an accessory is connected to the connector 101 of the electronic device 100, the control unit 110, before determining whether the voltage level at the audio contact is greater (or smaller) than the first threshold, sets the audio contact N1 to a low voltage level (e.g., ground) for a first time period and then enables the power signal to be provided at the audio contact for a second time period, thereby resetting the voltage level of the accessory.

In another embodiment, the initialization command may include a delay time, which is sent to the accessory 200. In one embodiment, the electronic device 100 may be in a power saving state, such as a standby or hibernation state, and the delay time carried by the initialization command may be set to a time period required for the electronic device 100 to resume from the power saving state to a normal state, thereby ensuring that the electronic device 100 can wake up and receive the control signal from the accessory 200 properly.

In other embodiments, the accessory 200, which is compliant with the communication protocol, can further operate in other operation mode(s), besides the communication protocol, for communication between the accessory and different electronic devices, so as to support different types of electronic devices, which may not be compliant with the communication protocol. In one embodiment, after the connector 201 is electrically connected to an electronic device, which may not be compliant with the communication protocol, if it is determined that no initialization command is received (for example, within a time interval), the controller 220 operates in a second operation mode (i.e., legacy mode), in which the controller 220 generates a voltage level corresponding to an user input received by the control interface unit 240 and sends the voltage level through the data terminal PD and the signal line 202 to the electronic device. In this embodiment, a plurality of control signals can be defined corresponding to different voltage levels.

In other embodiments, the electronic device 100 can further include at least one voltage level shifter or other circuit elements for voltage level conversion. In these embodiments, at least one of the first and second terminals T1 and T2 of the control unit 110 is coupled to the audio contact N1 of the connector 101 through one or more voltage level shifters, so as to support different signaling requirements for various circuit components.

Figure 3:
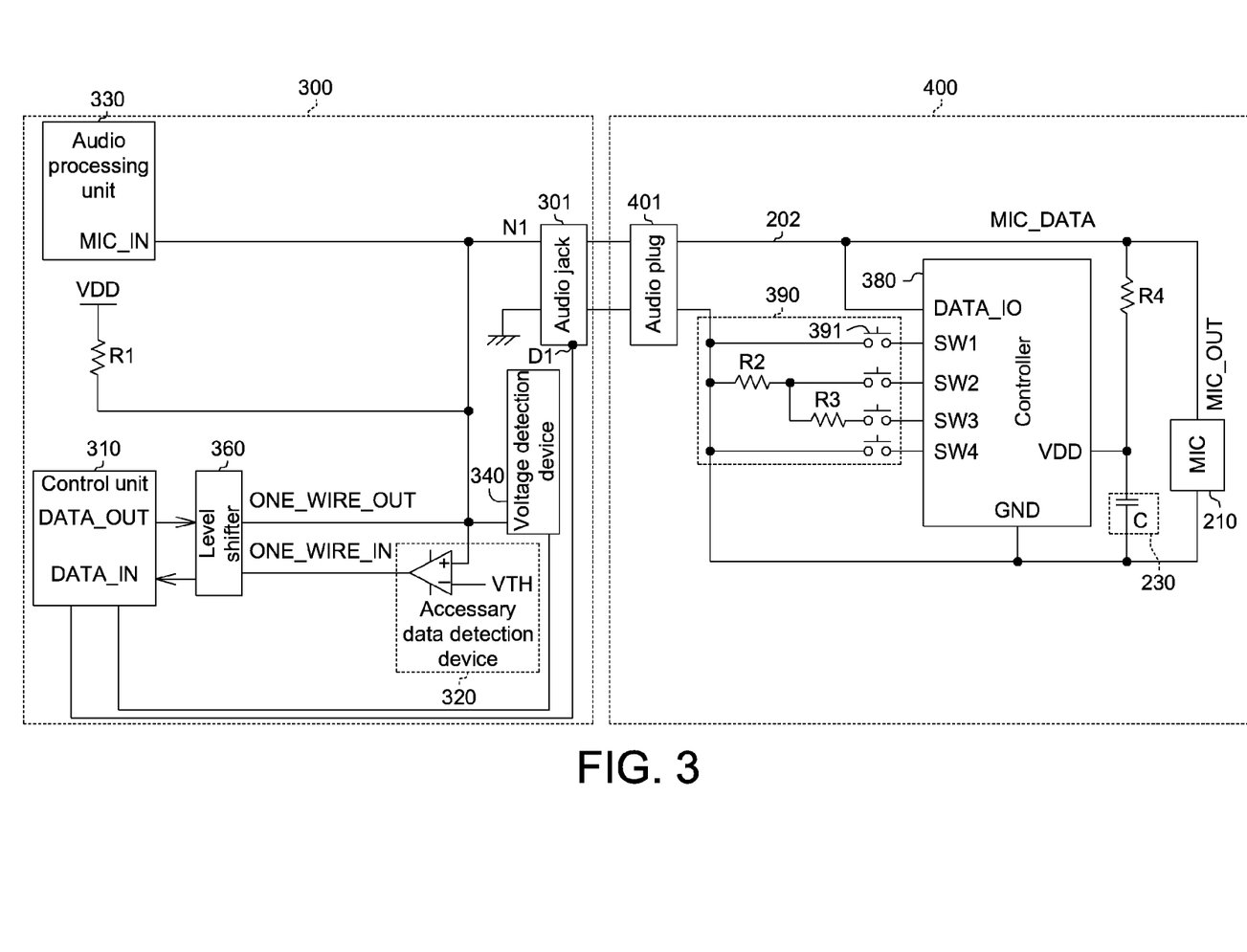
FIG. 3 shows a circuit block diagram of an electronic device connected to an accessory according to another embodiment of the present disclosure.

As an example, FIG. 3 shows a circuit block diagram of an electronic device 300 connected to an accessory 400 according to another embodiment of the present disclosure. The electronic device 300 includes an audio jack (i.e., a connector) 301, a control unit 310, an accessory data detection device 320, an audio processing unit 330 (e.g., CODEC), a voltage detection device 340 (e.g., an analog-to-digital converter), and a voltage level shifter 360. The audio jack 301 has an audio contact N1 for receiving an audio signal from a microphone 210 of the accessory 400 and a detection contact D1 for detecting a complete electrical connection of the audio jack 301 with an audio plug 401 of the accessory 400. The accessory data detection device 320 is implemented by a comparator with a threshold voltage VTH. The control unit 310 has a first terminal DATA_OUT and a second terminal DATA_IN, which are coupled to the audio contact N1 through the voltage level shifter 360 for outputting and inputting signals. The voltage level shifter 360 has two terminals ONE_WIRE_OUT and ONE_WIRE_IN, corresponding to the terminals DATA_OUT and DATA_IN, respectively. The audio processing unit 330 has a terminal MIC_IN coupled to the audio contact N1.

The accessory 400 includes an audio plug (i.e., a connector) 401, a controller 380, which is a one-wire protocol chip and supports a plurality of accessory IDs (AID), and a control interface unit 390 electrically coupled to the controller 380. The audio plug 401 may be a 2.5 mm or 3.5 mm standard audio plug in diameter with three or four contacts. The control interface unit 390, for example, has four remote control keys 391, which are implemented by four switches but not limited thereto. The accessory 400 also includes a microphone 210, a capacitive unit 230 (such as a capacitor C), coupled to a power pin VDD of the controller 380. The controller 380 includes four pins SW1, SW2, SW3, SW4 connected to the four keys 391 of the control interface unit 390, respectively, and one data input/output pin DATA_IO connected to the audio jack 301 through a signal line 202 and the audio plug 401 for outputting and transmitting a serial digital signal to the control unit 310 of the electronic device 300 and for receiving another serial digital signal from the control unit 310 of the electronic device 300.

In addition, the electronic device 300 and the accessory 400 may include other circuit elements. For example, a resistor R1 is coupled to a DC voltage for providing a power signal (biasing) to the audio contact N1. For example, in the control interface unit 390, resistors R2 and R3 are coupled between the audio plug 401 and the pins SW2 and SW3 of the controller 380.

The detecting mechanism performed by the electronic device and the accessory shown in FIG. 3 can lead to flexible and extendable control functionality and performance. In FIG. 2 and FIG. 3, detection methods can be implemented in the electronic device 100, 300 and the accessory 200, 400 based on the above-mentioned communication protocol (Refer to FIG. 4), in which serial digital signals are transmitted between the electronic device 100, 300 and the accessory 200, 400 via the audio contact N1 and the signal line 202, which can be referred to as one-wire protocol. In one example of the one-wire protocol, a plurality of accessory identifications (AID) can be supported, e.g., 63 different accessories can be differentiated by the host (i.e., the electronic device 100, 300). In addition, the four (or more) keys 391 of the control interface unit 390 may be a "Backward" key, a "Play/ Stop" key, a "Forward" key and a "Launch Application" key for playing multimedia contents, such as music, image, video, or launching an application program. Since the one-wire protocol is implemented by transmitting serial digital signals, which will be described below, for communication between the electronic device 100, 300 and the accessory 200, 400, the detection and determination of an accessory can be more accurate and faster than that of the conventional approach using voltage level detection.

By way of the protocol, flexibility and extensibility of the control functionality of an accessory can be achieved. In some examples, two or more keys 391 of the control interface unit 390 can be pressed at the same time to indicate more control functions. In some examples, other control functions, such as volume control, phone call control, web browsing control, gaming control, and so on, can also be assigned to the control interface unit 390. The control functionality may also be switched with respect to an operation mode or an executing application program of the electronic device. For example, the keys 391 of the control interface unit 390 can be used for web browsing (or gaming) when the user is browsing the web (or playing the game), and then can be switched for phone call control when the user receives an incoming call or makes a phone call.

Referring to FIG. 4, other embodiments of the communication protocol between the electronic device and the accessory shown in FIGS. 2-3 can be derived based on the initial form as mentioned above. Step 1: The controller 220, 380 of the accessory 200, 400 operates in "legacy mode" by default, if no initialization command is received from the host (i.e., the electronic device 100, 300). Step 2: The host sends an initialization command to the controller 220, 380 to initiate the one-wire protocol with the following settings: "interrupt delay", "operation mode", and "response time", which will be further described below. Step 3: The controller 220, 380 reports its accessory ID to the host and changes its operation mode from "Legacy mode" to "One-Wire mode." Step 4: The host identifies the accessory as a legacy headset (i.e., regarding the accessory as a conventional headset), if no AID is reported from the controller 220, 380 of the accessory 200, 400.

Figure 5:
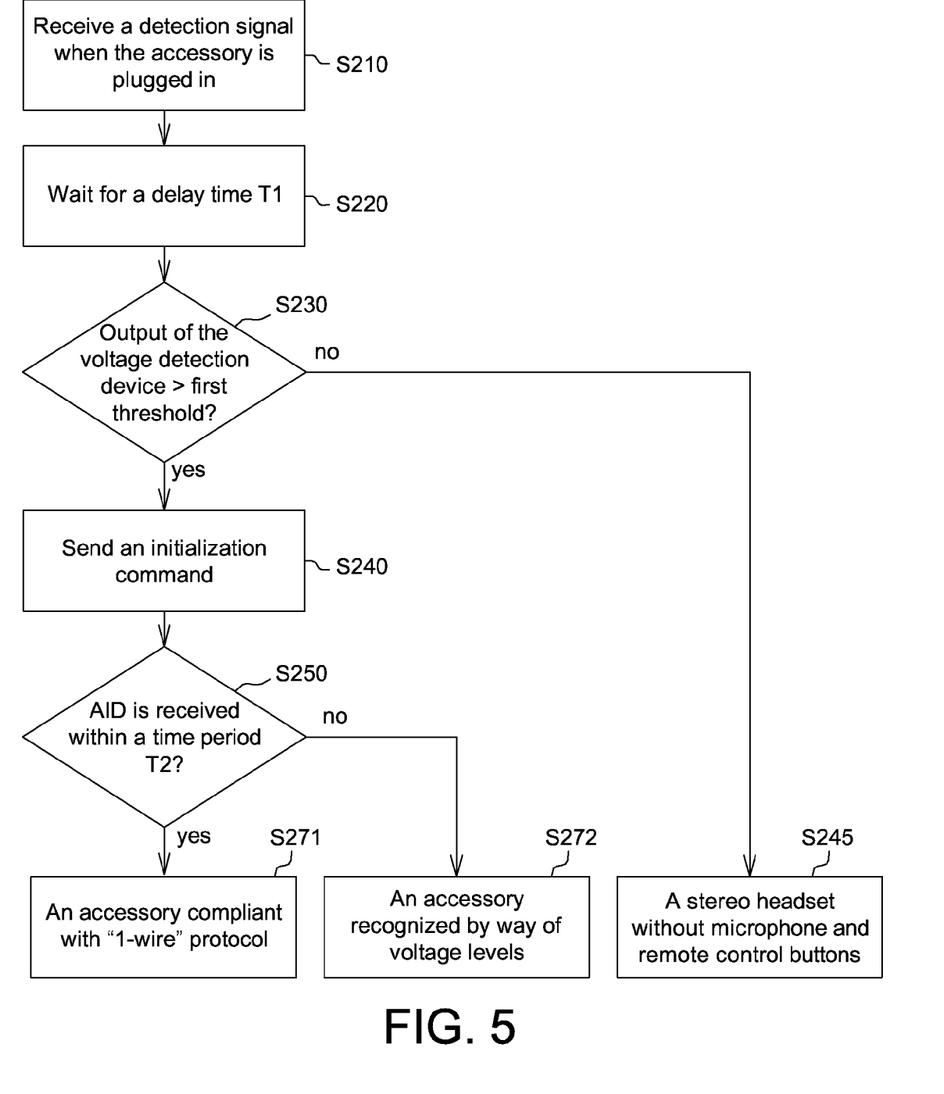
FIG. 5 shows a flowchart of a detecting method according to one embodiment of the present disclosure when a plug of the accessory is plugged into the audio jack of the electronic device shown in FIGS. 2 and 3.

FIG. 5 shows a flowchart of the detecting method according to one embodiment of the present disclosure when an accessory is plugged into the audio jack of the electronic device shown in FIGS. 2 and 3. Referring to FIGS. 2, 3 and 5, firstly, when the accessory is electrically connected to the audio jack 101, 301 of the electronic device 100, 300, the control unit 110, 310 receives a detection signal, indicating a complete electrical connection of the accessory with the electronic device 100, 300, from the detection contact D1 in step S210, and then the electronic device 100, 300 waits for a delay time t1 for charging a capacitive unit, if any, in the accessory, e.g., the capacitive unit 230 in the accessory 200, 400. After the delay time t1 regardless of whether any capacitive unit is charged, it is determined whether the output, e.g. a digital signal representing the detected voltage level, of the voltage detection device (such as an analog-to-digital converter) 140, 340 satisfies a condition, e.g., whether the output is greater (or smaller) than a first threshold in step S230. If so, the control unit 110, 310 of the electronic device 100, 300 sends an initialization command to the accessory, in step S240. If not, it is determined that the accessory connected to the audio jack 101, 301 is an accessory not compliant with the "1-wire" protocol (step S245), which may be a stereo headset without microphone and remote control buttons.

After the electronic device 100, 300 sends the initialization command to the accessory, the control unit 110, 310 of the electronic device 100, 300 determines whether it receives the AID within a time period t2 from the accessory, in step S250. If so, it is determined that the accessory connected to the audio jack 101, 301 is an accessory compliant with the "1-wire" protocol (step 271), such as the accessory 200, 400 shown in FIG. 2 or 3. If the electronic device 100, 300 does not receive the AID within the time period t2 from the accessory via the audio jack 101, 301, it is determined that the accessory connected to the audio jack 101, 301 is an accessory not compliant with the "1-wire" protocol (step 272), which may be a headset that is conventionally recognized by way of the output of the voltage detection device 340 (e.g., ADC value or voltage level).

Figure 6:
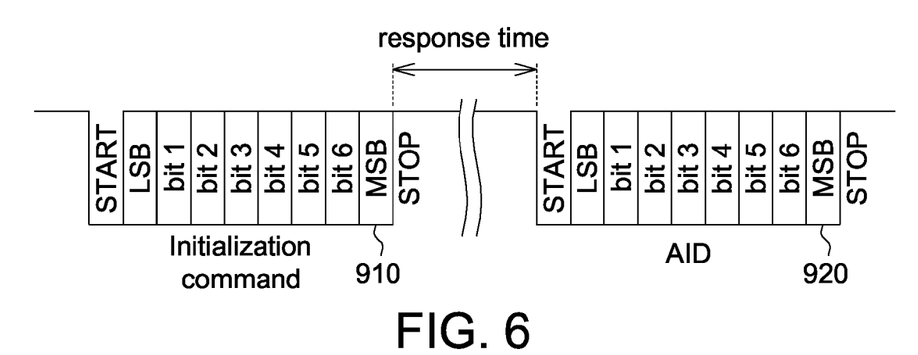
FIG. 6 shows a timing diagram of serial digital signals including an initialization command and an AID according one embodiment of the present disclosure.
Figure 7:
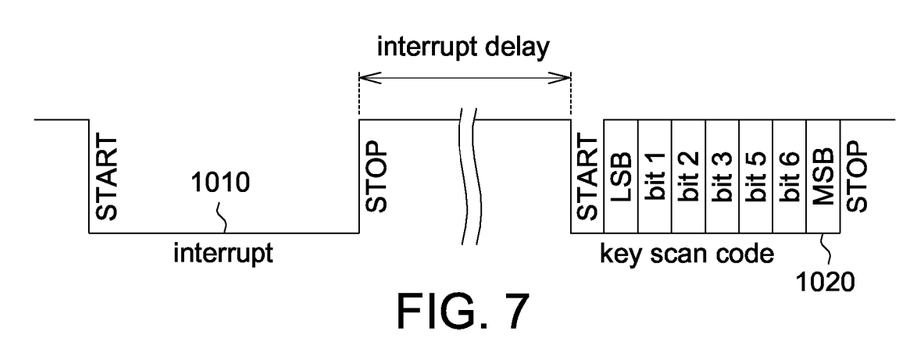
FIG. 7 shows a timing diagram of serial digital signals including an interrupt and a key scan code according to one embodiment of the present disclosure.

According to the detecting method of the embodiments, only one wire, e.g. the single electrical path formed by at least the signal line 202 of the accessory 200, 400 and the audio contact N1 of the electronic device 100, 300, is used for transmitting serial digital signals between the control unit 110, 310 of the electronic device 100, 300 and the controller 220, 380 of the accessory 200, 400 shown in FIGS. 2-3. The transmitted serial digital signals include at least one initialization command and/or at least one query command transmitted from the electronic device 100, 300 to the accessory 200, 400, and include accessory data (e.g., AID) and control signals (e.g., key scan codes) transmitted from the accessory 200, 400 to the electronic device 100, 300. FIG. 6 shows a timing diagram of serial digital signals including an initialization command and an AID according one embodiment of the present disclosure. FIG. 7 shows a timing diagram of serial digital signals including an interrupt and a key scan code transmitted in one-wire mode according to one embodiment of the present disclosure.

Referring to FIGS. 2, 3, 4 and 6, the electronic device 100, 300, i.e. the host, can send an initialization command, represented by at least one bit (e.g., eight bits) 910, to the accessory 200, 400, and the accessory 200, 400 sends an AID, also represented by at least one bit (e.g., eight bits) 920, back to the electronic device 100, 300 accordingly after a response time (such as 5 ms). The bit order of the serial digital signal is from LSB to MSB.

In one embodiment of the present disclosure, there are eight bits 910, which are used for representing the initialization command and include at least two bits (e.g., LSB and bit 1) for indicating "command type", at least one bit (e.g., bit 2) for indicating "response time", at least one bit (e.g., bit 3) for indicating "operation mode", at least three bits (e.g., bits 4-6) for indicating "interrupt delay", and at least one bit (e.g., MSB) to be reserved. The following Table 1 shows the indications of each bit of the initialization command according to one embodiment of the present disclosure.

TABLE 1

| Bit 7 | Reserved, for example |
|---|---|
| Bit [6:4] | Interrupt delay:<br>These three bits configure the interrupt delay time after the interrupt, sent from the accessory 200, 400, for the controller unit 110, 310 to re-initiate its clock and be ready to receive signals from the accessory 200, 400. The controller 220, 380 sends the digital serial signal, e.g., key scan code, to the electronic device 100, 300 after the interrupt delay.<br>000: Delay for a first time period(e.g., 5 ms)<br>001: Delay for a second time period (e.g., 7 ms)<br>010: Delay for a third time period (e.g., 9 ms)<br>011: Delay for a fourth time period (e.g., 11 ms)<br>100: Delay for a fifth time period (e.g., 13 ms)<br>101: Delay for a sixth time period (e.g., 16 ms)<br>110: Delay for a seventh time period (e.g., 20 ms)<br>111: Reserved |
| Bit 3 | Operation mode:<br>0: One-wire mode<br>1: Legacy mode |
| Bit 2 | Response time:<br>The bit configures the delay time, for which the controller 220, 380 of the accessory 200, 400 delays sending AID information to the electronic device 100, 300 after receiving the initialization command from the electronic device 100, 300.<br>0: Delay for a first time period (Default)<br>1: Delay for a second time period |
| Bit [1:0] | Command Type:<br>These 2 bits indicate the command type initiated from the electronic device 100, 300.<br>00: Initialization command |

In addition, the serial digital signal (hereinafter, also referred to as "accessory data") transmitted from the accessory 200, 400 to the electronic device 100, 300 may use at least one bit (e.g., MSB) to decide the indications of the rest bits (e.g., LSB to bit 6). For example, when MSB of the accessory data is 1, the indications of LSB to bit 6 are shown in the following Table 2 in one embodiment.

TABLE 2

| Bit 7 | AID/DATA<br>1: Bit[5:0] indicates Accessory ID |
|---|---|
| Bit 6 | Operation mode<br>0: One-wire mode<br>1: Legacy mode |
| Bit [5:0] | Accessory ID<br>000000: Reserved<br>000001: Accessory ID #1<br>000010: Accessory ID #2<br>. . .<br>111110: Accessory ID #62<br>111111: Accessory ID #63 |

Referring to FIGS. 2, 3, 7, in one-wire mode, the interrupt, represented by a voltage level (e.g., low voltage level) 1010, and the key scan code (i.e. control signal), represented by at least one bit (e.g., eight bits) 1020, are sent from the accessory 200, 400 to the electronic device 100, 300 when a user input is received by the control interface unit 240, 390. For example, when at least one remote control key 391 is pressed by a user, the controller 380 of the accessory 400 sends a low voltage level, which represents an interrupt, to the electronic device 300 and then delays, for an interrupt delay time (i.e. the interrupt delay described in TABLE 1), sending the key scan code, corresponding to the pressed key 391, to the electronic device 300. The key scan code, indicating which key is pressed, will be described in the following Table 3. When MSB of the accessory data is 0, the indications of LSB to bit 6 are shown in the following Table 3 in one embodiment.

TABLE 3

| | Bit[7:7] AID/DATA | Bit[6:4] Reserved | Bit[3:0] | | | | Description Scan code mapping |
| --- | --- | --- | --- | --- | --- | --- | --- |
| | | | SW 4 | SW 3 | SW 2 | SW 1 | |
| Accessory | 0 | 111 | 1 | 1 | 1 | 1 | All is released, for example |
| Key | 0 | 111 | 1 | 1 | 1 | 0 | SW #1 is pressed |
| Scan | 0 | 111 | 1 | 1 | 0 | 1 | SW #2 is pressed |
| Code | 0 | 111 | 1 | 0 | 1 | 1 | SW #3 is pressed |
| Data | 0 | 111 | 0 | 1 | 1 | 1 | SW #4 is pressed |
| | 0 | 111 | 1 | 1 | 0 | 0 | SW #1&2 are pressed |
| | 0 | 111 | 1 | 0 | 1 | 0 | SW #1&3 are pressed |
| | 0 | 111 | 0 | 1 | 1 | 0 | SW #1&4 are pressed |
| | 0 | 111 | 1 | 0 | 0 | 1 | SW #2&3 are pressed |
| | 0 | 111 | 0 | 1 | 0 | 1 | SW #2&4 are pressed |
| | 0 | 111 | 0 | 0 | 1 | 1 | SW #3&4 are pressed |
| | 0 | 111 | 1 | 0 | 0 | 0 | SW #1&2&3 are pressed |
| | 0 | 111 | 0 | 1 | 0 | 0 | SW #1&2&4 are pressed |
| | 0 | 111 | 0 | 0 | 1 | 0 | SW #1&3&4 are pressed |
| | 0 | 111 | 0 | 0 | 0 | 1 | SW #2&3&4 are pressed |
| | 0 | 111 | 0 | 0 | 0 | 0 | All pressed, for example |

In one embodiment, the electronic device 100, 300 can also send different query commands to the controller 220, 380 of the accessory 200, 400. The query commands may be read commands and can obtain the status of the accessory 200, 400. In addition, the query commands can also be represented by eight bits including at least two bits, e.g. Bit [0:1] for indicating four different query commands.

For example, if the two bits, e.g., Bit [0:1], are 10, the query command may be a Query AID command for requesting the accessory 200, 400 to send back the AID from the controller 220, 380. When the controller 220, 380 receives the Query AID command, it ignores bit 2 to MSB (e.g., Bit [2:7]) and sends the AID to the electronic device 100, 300 according to the two bits Bit [0:1]. In this embodiment, the format of the accessory data for responding the Query AID command may be the same with the format shown in the above-mentioned TABLE 2.

In another embodiment, for example, if the two bits, e.g., Bit [0:1], are 01, the query command may be a Query Timing configuration command for requesting the accessory 200, 400 to send back the time of interrupt delay of the accessory for timing configuration from the controller 220, 380. When the controller 220, 380 receives the Query Timing configuration command, it will ignore bit 2 to MSB (e.g., Bit [2:7]) and send the interrupt delay time, which may be represented by three bits as defined in TABLE 1, to the electronic device 100, 300 according to the two bits Bit [0:1].

Figure 8:
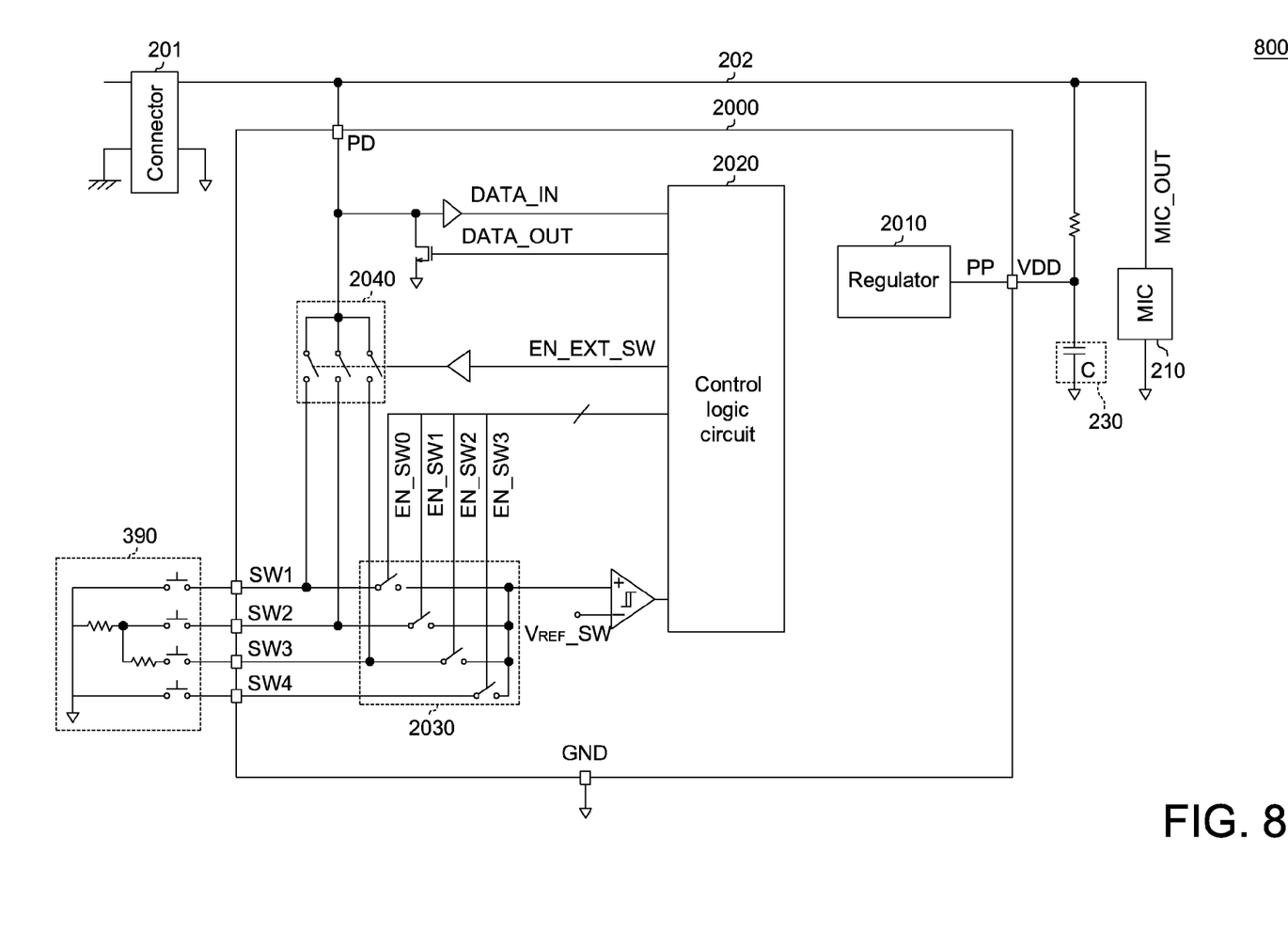
FIG. 8 shows a block diagram of an accessory according to an embodiment of the present disclosure.

FIG. 8 shows a block diagram of an accessory 800 according to an embodiment of the present disclosure. In one embodiment, a controller 2000 of an accessory 800 includes a regulator 2010 connected to a power terminal PP, a control logic circuit 2020 coupled to a data terminal PD, and a plurality of first switching devices 2030, coupled between a plurality of control terminals, e.g., SW1-SW4, and the control logic circuit 2020. When the accessory 800 is in a first operation mode (such as one-wire mode as mentioned above), the controller 2000 enables the first switching devices 2030. In this way, in response to a user input received by the control interface unit 390, the control interface unit 390 generates a input signal and sends it to the control logic circuit 2020, and the control logic circuit 2020 outputs a control signal (e.g., in serial digital form as exemplified in one or more embodiments above), corresponding to the input signal, through the data terminal PD and the signal line 202 to the electronic device (not shown). The control logic circuit 2020 may be implemented to use one terminal for outputting the control signal, denoted by DATA_OUT, and another terminal for receiving a command signal (e.g., initialization command or query command), denoted by DATA_IN, from the electronic device through the data terminal PD. In addition, the control logic circuit 2020 may generate one or more switching control signals, denoted by EN_SW0, EN_SW1, EN_SW2, and EN_SW3, for example, to control the first switching devices 2030 and receive the input signal from the control interface unit 390 through the enabled first switching devices 2030 using a triggering circuit, such as a Schmitt trigger with a reference voltage $V_{REF\_SW}$.

In another embodiment, the controller 2000 may further include a plurality of second switching devices 2040, coupled between the control terminals SW1-SW4 and the data terminal PD, so as to support different types of electronic devices, including the one compliant with the protocol (such as 1-wire mode as mentioned above) and the one not compliant with the protocol. When the accessory 800 is in the first operation mode (e.g., one-wire mode), the controller 2000 enables the first switching devices 2030 and disables the second switching devices 2040. When the accessory 800 is in a second operation mode (e.g., legacy mode), the controller 2000 disables the first switching devices 2030 and enables the second switching devices 2040. In this way, in response to a user input received by the control interface unit 390, a control voltage corresponding to the input signal generated by the control interface unit 390 is provided through the data terminal PD and the signal line 202 to an electronic device connected to the accessory 800. In addition, the control logic circuit 2020 may generate at least one switching control signal, such as one denoted by EN_EXT_SW, for example, to control the second switching devices 2040.

As in the above embodiment, the controller 2000 supports at least the first and second two operation modes. Thus, when an accessory supporting the two operation modes is connected to an electronic device compliant with the protocol, the accessory 800 enters the first operation mode. Otherwise, the accessory 800 enters the second operation mode. In a scenario that an electronic device is in a power saving state (such as a standby or hibernation state), the accessory, when connected to the electronic device, may send a control signal in serial digital form with the interrupt event with a delay time (which may be a default value), as exemplified above, or provide a control voltage corresponding to a user input, as so as to wake up the electronic device, even the electronic device is compliant with the protocol.

Further, FIG. 1 is for the sake of illustration only. According to the above embodiments, different types of accessories may be implemented, such as headsets with single earphone or double earphones. In addition, the microphone may be externally or internally equipped. The headsets may be over-the-head headsets, backwear-headsets, over-the-ear headsets, or convertible headsets. In other examples, the control interface unit on the headset may be equipped with a plurality of buttons/keys or other control device and/or the microphone. In addition, the microphone may be equipped in other portion of the headset separate from the control interface unit.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An electronic device, comprising:
   a connector for connecting to an accessory, the connector having an audio contact;
   a control unit having a first terminal and a second terminal, which are coupled to the audio contact of the connector, wherein the control unit is configured to send a command, which is represented by a first serial digital signal, to the accessory through the first terminal and the audio contact when the accessory is electrically connected to the connector, and to receive accessory data, which is represented by a second serial digital signal and generated by the accessory in response to the command, through the second terminal and the audio contact;
   a voltage detection device, configured to detect a voltage level at the audio contact; and
   an audio processing unit coupled between the audio contact and the control unit and configured to receive an audio signal from the accessory through the audio contact,
   wherein the accessory data includes an identification of the accessory, and when the control unit, after sending the command, receives the identification of the accessory, the electronic device enters a first operation mode, in which the control unit operates in response to a control signal; or when the control unit, after sending the command, does not receive the identification of the accessory, the electronic device enters a second operation mode, in which the control unit operates in response to the voltage level detected by the voltage detection device.

2. The electronic device according to claim 1, further comprising:
   an accessory data detection device coupled between the audio contact and the second terminal of the control unit and configured to receive the accessory data through the audio contact, output the received accessory data to the control unit, and ignore the audio signal at the audio contact.

3. The electronic device according to claim 2, wherein the accessory data detection device includes:
   a comparator configured to receive the accessory data at the audio contact and a reference signal.

4. The electronic device according to claim 1,
   wherein the voltage detection device is coupled to the audio contact and the control unit,
   wherein the control unit sends the command through the first terminal of the control unit when the voltage level at the audio contact detected voltage detection device is greater or smaller than a first threshold.

5. The electronic device according to claim 4, wherein the voltage detection device comprises:
   an analog-to-digital converter configured to receive the voltage level at the audio contact and to output a digital signal indicating the voltage level to the control unit.

6. The electronic device according to claim 4, wherein the control signal is represented by a third serial digital signal, received from the accessory through the second terminal and the audio contact.

7. The electronic device according to claim 4, wherein when the accessory is electrically connected to the connector, the control unit enables a power signal to be provided at the audio contact for a time period.

8. The electronic device according to claim 1, wherein the accessory data includes an identification of the accessory, if the control unit receives the identification of the accessory, the electronic device enters a first operation mode, in which the control unit operates in response to the control signal, which is represented by a third serial digital signal, received from the accessory through the second terminal and the audio contact.

9. The electronic device according to claim 8, wherein the command includes a response time, for which the accessory delays sending the identification of the accessory after receiving the command.

10. The electronic device according to claim 1, further comprising at least one voltage level shifter, wherein at least one of the first and second terminals of the control unit is coupled to the audio contact of the connector through the at least one voltage level shifter.

11. The electronic device according to claim 1, further comprising a communication unit, coupled to the control unit, for wirelessly transmitting the audio signal to a remote unit during a communication session.

12. The electronic device according to claim 1, wherein the connector is a 2.5 mm or 3.5 mm audio jack and the accessory is a headset.

13. An accessory for an electronic device, comprising:
   a connector for connecting to the electronic device;
   a microphone;
   a microphone line configured to connect the microphone to the connector;
   a control interface unit;
   a controller, having a plurality of terminals including a power terminal, a data terminal, and a plurality of control terminals, wherein the power terminal is coupled to the microphone line, the data terminal is coupled to the microphone line, and the control terminals are coupled to the control interface unit;

wherein when the connector is connected to the electronic device, the power terminal receives a power signal for powering the controller, and in response to a command, which is represented by a first serial digital signal and received through the microphone line and the data terminal from the electronic device, the controller sends an identification of the accessory, which is represented by a second serial digital signal, through the data terminal and the microphone line to the electronic device, wherein when the identification of the accessory is received by the electronic device, the electronic device enters a first operation mode and operates in response to a control signal; or if the identification of the accessory is not received by the electronic device, the electronic device enters a second operation mode and operates in response to a voltage level at an audio contact of the electronic device when the accessory is electrically connected to the electronic device.

14. The accessory according to claim 13, wherein the command includes a response time, for which the controller delays sending the identification of the accessory through the data terminal after receiving the command from the electronic device.

15. The accessory according to claim 13, wherein after sending the identification of the accessory, the controller enters the first operation mode, in which the controllers sends a control signal, which is represented by a third serial digital signal and corresponds to an input signal generated by the control interface unit, through the data terminal and the microphone line to the electronic device.

16. The accessory according to claim 13, wherein the controller comprises:
   a regulator connected to the power terminal;
   a control logic circuit coupled to the data terminal;
   a plurality of first switching devices, coupled between the control terminals and the control logic circuit,
   wherein when the accessory operates in the first operation mode, the first switching devices are enabled so that in response to an input signal generated by the control interface unit, the control logic circuit sends a control signal, which is represented by a third serial digital signal, through the data terminal and the microphone line to the electronic device.

17. The accessory according to claim 16, wherein the controller further comprises:
   a plurality of second switching devices, coupled between the control terminals and the data terminal;
   wherein when the accessory operates in the first operation mode, the second switching devices are disabled;
   wherein when the accessory operates in a second operation mode, the first switching devices are disabled and the second switching devices are enabled so that in response to an input signal generated by the control interface unit, a control voltage corresponding to the input signal is provided through the data terminal and the microphone line to the electronic device.

18. The accessory according to claim 13, wherein the accessory is a headset, the connector is a 2.5 mm or 3.5 mm audio plug, and the control interface unit includes a plurality of buttons.

19. A method, implemented in an electronic device having a connector, for detecting an accessory, comprising:
   when the accessory is electrically connected to the electronic device, providing the power signal at an audio contact of the connector;
   sending a command, which is represented by a first serial digital signal, to the accessory through the audio contact;
   determining whether an identification of the accessory, which is represented by a second digital signal, is received at the audio contact;
   when the identification of the accessory is received, determining the accessory is of a first type, and the electronic device enters a first operation mode and operates in response to a control signal; otherwise, determining the accessory is of a second type, and the electronic device enters a second operation mode and operates in response to a voltage level at an audio contact of the electronic device when the accessory is electrically connected to the electronic device.

20. The method according to claim 19, wherein after the power signal is provided at the audio contact, the method further comprises:
   determining whether the voltage level at the audio contact is greater or smaller than a first threshold;
   sending the command to the accessory when it is determined that the voltage level is greater or smaller than the first threshold, or determining the accessory is of a third type when the voltage level is not greater or smaller than the first threshold.

21. The method according to claim 19, wherein the command includes a response time, for which the accessory delays sending the identification of the accessory after receiving the command from the electronic device.

22. The method according to claim 19, further comprising:
   operating in response to the control signal, which is represented by a third serial digital signal and corresponds to a first user input received by the accessory when it is determined that the accessory is of the first type; or operating in response to the voltage level corresponding to a second user input received by the accessory when it is determined that the accessory is of the second type.

* * * * *